(12) United States Patent
Bouvier

(10) Patent No.: US 6,516,827 B1
(45) Date of Patent: Feb. 11, 2003

(54) GAS REGULATOR FOR FLOWMETER

(75) Inventor: Daniel Bouvier, Paris (FR)

(73) Assignee: Compagnie des Gaz de Petrole Primagaz, Paris (FR)

( * ) Notice: Subject to any disclaimer, the term of this patent is extended or adjusted under 35 U.S.C. 154(b) by 0 days.

(21) Appl. No.: 09/857,454

(22) PCT Filed: Nov. 30, 1999

(86) PCT No.: PCT/FR99/02954

§ 371 (c)(1),
(2), (4) Date: Jun. 1, 2001

(87) PCT Pub. No.: WO00/33036

PCT Pub. Date: Jun. 8, 2000

(30) Foreign Application Priority Data

Dec. 2, 1998 (FR) .............................. 98 15195

(51) Int. Cl.[7] .............................. G05D 16/02
(52) U.S. Cl. .............. 137/468; 137/505.14; 137/505.46
(58) Field of Search ........................... 137/505, 505.46, 137/505.47, 505.14, 468

(56) References Cited

U.S. PATENT DOCUMENTS

| 2,259,280 A | * | 10/1941 | Wile | 137/468 |
| 3,475,916 A | * | 11/1969 | Smith | |
| 3,854,663 A | * | 12/1974 | Goldsberry | 137/468 |
| 4,317,374 A | | 3/1982 | Casey | |
| 4,417,689 A | | 11/1983 | Sasaki | |
| 4,823,593 A | | 4/1989 | Furlong et al. | |
| 5,174,326 A | * | 12/1992 | Steinert et al. | 137/468 |

FOREIGN PATENT DOCUMENTS

DE      721 896     6/1942

* cited by examiner

Primary Examiner—Stephen M. Hepperle
(74) Attorney, Agent, or Firm—Knobbe, Martens, Olson & Bear, LLP

(57) ABSTRACT

A measuring device for gas flows including a gas regulator positioned immediately upstream of a volumetric meter for determining the volume of a gas passing therethrough. The measuring device includes means for modifying the pressure of the gas expansion at the regulator output based on the temperature of the gas.

6 Claims, 1 Drawing Sheet

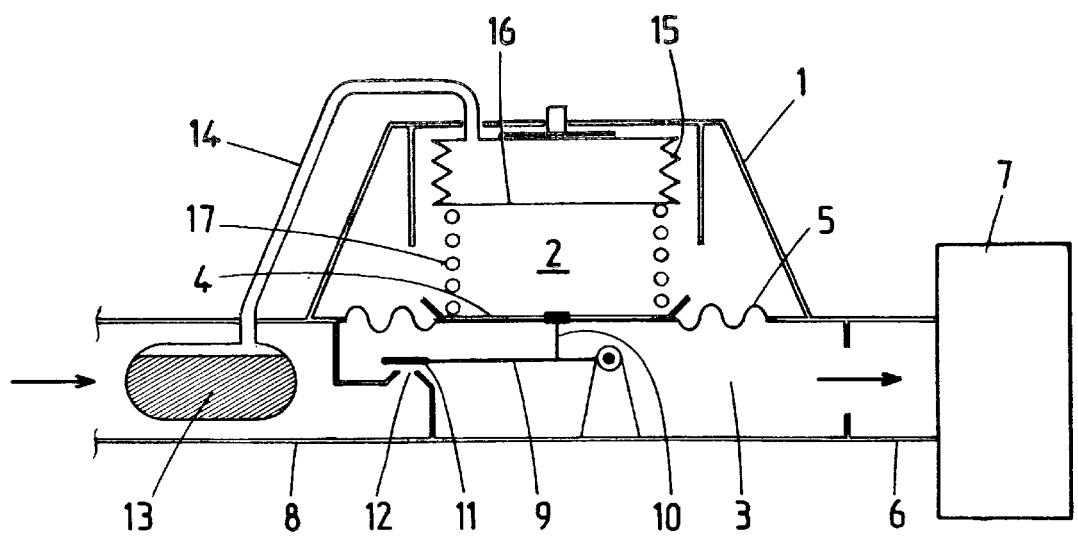

GAS REGULATOR FOR FLOWMETER

BACKGROUND OF THE INVENTION

1. Field of the Invention

The present invention relates to gas regulator valves and apparatus for measuring the quantity of gas, notably hydrocarbons, leaving a tank or other pressurised container.

2. Description of the Related Art

Using a meter mounted directly on a tank does indeed enable the tank to be delivered with its meter already fitted at the factory, but this has the following drawback. The meter, which is often a membrane-type meter, measures volumes of gas, irrespective of the density of the gas. Under certain conditions, e.g. a fast flow rate, a very low external temperature, tanks buried in the ground, the temperature of the gas may drop considerably and the density of the product may increase accordingly. The distribution company then supplies more gas than the meter indicates.

German patent no. 721 896 remedies this by mounting, upstream or downstream of a volumetric meter, a valve displaced by a membrane subjected to the opposed forces of the pressure of the gas and the pressure of an auxiliary fluid coming from a reservoir which takes the temperature of the gas. This throttle valve for the gas has a pressure-reducing effect, but it alters the flow rate of the gas. For reasons of work organisation it is undesirable for the flow rate and hence the time taken to fill a tank to be dependent on the temperature, more especially as any variation in this length of time would otherwise be an indication of a fault.

SUMMARY OF THE INVENTION

The invention remedies this disadvantage with a gas regulator valve comprising means for lowering the pressure of a gas current to a specified pressure while maintaining the flow rate.

According to the invention, the relief pressure in the regulator valve is varied as a function of either the temperature of the gas or the ambient temperature. In this way, the last stage of pressure relief situated just in front of the meter is controlled around its nominal specified level by a device controlled by the temperature of the gas and arranged so that the pressure variation compensates for the variations in density caused by the variations in temperature. Thus, when the gas is very cold and therefore very dense, the relief pressure is lowered so as to compensate for the increase in density. Conversely, when the temperature rises, the relief pressure of the final stage of pressure relief, located just upstream of the meter, is increased.

The invention also relates to a measuring device mounted, in particular, on a tank comprising a gas regulator valve according to the invention upstream of a meter adapted to measure the volume of gas passing therethrough. Preferably, the gas regulator valve comprises a body subdivided by a membrane into a first compartment in which a spring applies a force to the membrane and a second compartment into which an inlet tube and an outlet tube open and in which is mounted a regulating mechanism, comprising a valve and seat, operating as a function of the position of the membrane subjected to the pressure of the gas prevailing in the second compartment. The means intended to modify the specified pressure comprise a bellows in contact with the spring and supplied with a readily expandable fluid or a liquefied gas which may be of the same type as the gas which is to be measured, coming from a capsule placed in the inlet tube or outside the regulator valve and exposed to ambient temperature.

BRIEF DESCRIPTION OF THE DRAWINGS

The single FIGURE of the accompanying drawing illustrates a measuring device according to the invention.

DETAILED DESCRIPTION OF THE PREFERRED EMBODIMENT

The diagrammatic sectional view shown in the FIGURE shows a regulator valve body 1, which defines a first compartment 2 and a second compartment 3 separated from one another by a valve spring washer 4 bordered by a resilient membrane 5. The compartment 3 communicates via an outlet tube 6 with a meter 7. It also communicates with an inlet tube 8 leading to the inside of a tank (not shown). In the second compartment 3 is a lever 9 which is fixedly attached to the valve spring washer 4 by an arm 10 and which has, at its free end, a valve 11, the assembly being such that the valve moves towards a seat 12 and away from it as the valve spring washer 4 and membrane 5 rise or fall.

In the tube 8 is provided a capsule 13 containing a fluid or a liquefied gas which may be of the same type as the gas present in the tank. The capsule 13 could also be outside the regulator valve and exposed to ambient temperature. A capillary 14 connects the capsule to the inside of a bellows 15 which is in contact, by its front 16, with the upper turn of a spring 17, the lower turn of which bears on the valve spring washer 4.

If the gas entering the pipe 8 is very cold, the capsule 13 cools down and the gas contained therein applies a lower pressure to the bellows 15, which presses less on the spring 17, which in turn tends to apply less force to the valve spring washer 4 and membrane 5. Thus, a lower pressure prevails in the compartment 3, with the result that the volume of gas measured by the meter 7 is metered under a lower pressure while the flow rate remains constant.

What is claimed is:

1. A gas regulator valve comprising means for lowering the pressure of a gas stream flowing therethrough to a specified pressure such that the mass flow rate of the gas stream is maintained at a substantially constant value wherein the pressure lowering means lowers the pressure of the gas stream as a function of temperature wherein the pressure lowering means comprises:

a spring;

a membrane;

an inlet tube;

an outlet tube;

a body subdivided by the membrane into a first compartment in which the spring applies a force to the membrane and a second compartment into which the inlet and outlet tubes open wherein the membrane is subject to the pressure of the gas contained within the second compartment;

a regulating mechanism comprising a valve and a seat wherein the regulating mechanism is mounted in the second compartment and wherein the regulating mechanism operates as a function of the position of the membrane as subjected to by the pressure of the gas within the second compartment;

a bellows in contact with the spring; and a capsule supplying a fluid to the bellow.

2. The gas regulator of claim 1, wherein temperature is the temperature of the gas stream.

3. The gas regulator of claim 1, wherein temperature is the ambient temperature.

4. The gas regulator of claim 1, wherein the specified pressure is reduced when the temperature decreases and increased when the temperature increases.

5. The regulator valve of claim 1, wherein the capsule is positioned within the inlet tube.

6. The regulator valve of claim 1, wherein the capsule is positioned outside the body and is exposed to ambient temperature.

* * * * *